Patented Jan. 28, 1936

2,029,237

UNITED STATES PATENT OFFICE 2,029,237

PRODUCING VAT DYESTUFFS OF THE DIBENZANTHRONE SERIES

Karl Koeberle, Ludwigshafen-on-the-Rhine, Hugo Wolff, Mannheim, and Emil Krauch, Ludwigshafen-on-the-Rhine, Germany, assignors to General Aniline Works, Inc., New York, N. Y., a corporation of Delaware No Drawing. Application July 24, 1934, Serial No. 736,776. In Germany August 4, 1933

4 Claims. (Cl. 260—61)

The present invention relates to vat dyestuffs of the dibenzanthrone series and a process of producing same.

It is already known that nitrodibenzanthrones can be obtained according to the process described in the U. S. Patent No. 1,093,427 by treatment with high percentage nitric acid in organic diluents, as for example in glacial acetic acid or nitrobenzene. From dibenzanthrone and excess nitric acid in concentrated sulphuric acid and also from dibenzanthrone and highly concentrated nitric acid alone, however, oxidation products of dibenzanthrone are obtained.

We have now found that valuable vat dyestuffs of the dibenzanthrone series are obtained in a simple manner and in excellent yields by treating dibenzanthrones or their substitution products with aqueous nitric acid. The term "aqueous nitric acid" means solutions of nitric acid in water and in aqueous solutions, for example in aqueous sulphuric or phosphoric acid the content of nitric acid of these solutions not exceeding about 75 per cent, i. e. the solutions must contain at least about 25 per cent of water in each case. The nitration products thus obtained are free from hydroxy compounds; they dissolve in concentrated sulphuric acid giving violet or green colorations and dye vegetable fibres green or blue-green to dark blue shades from blue vats.

The yields are quantitative and the dyestuffs may frequently be directly converted into paste form from the nitration mixture without intermediate drying or dissolution and reprecipitation from sulphuric acid.

By treating the reduced nitration products with oxidizing agents in substance or on the fibres, the nitrodibenzanthrones, which themselves dye green shades, yield grey to black dyeings of very good fastness which are superior to the black dyeings produced from the nitration products according to the said U. S. Patent No. 1,093,427 as regards fastness to washing and boiling and strength.

A special advantage of the process according to this invention consists in the fact that it allows of the preparation of unitary dinitrobenzanthrones.

It is especially suitable to use for the nitration a nitric acid of from 40 to 65 per cent strength, but more concentrated acid, up to about 75 per cent, or more dilute acid, down to about 10 per cent, may also be employed for the nitration.

The following examples will further illustrate how the said invention may be carried out in practice but the invention is not restricted to these examples. The parts are by weight.

Example 1

500 parts of dibenzanthrone are suspended in 2500 parts of 60 per cent nitric acid while stirring. The whole is heated slowly to 80° C. and kept at the said temperature for from one to two hours. It is then allowed to cool, diluted with water, filtered by suction, washed until neutral and made into a paste or dried. According to analysis it is a dinitrodibenzanthrone. It is a violet powder which dissolves in concentrated sulphuric acid giving a violet coloration and yields green dyeings on vegetable fibres which by aftertreatment with hypochlorite become grey or black. These dyeings have very good fastness properties, superior to those of the black dyeings produced from the products according to the said U. S. Patent No. 1,093,427 as regards fastness to washing and boiling.

A similar reaction product is obtained from dibenzanthrone by treatment for two hours at from 75° to 80° C. with 55 per cent nitric acid.

The nitration may also be carried out at from 30° to 35° C. or at still lower temperatures, as for example at from 20° to 25° C. It is preferable in these cases to extend the time of reaction of the nitric acid on the dibenzanthrone.

The dinitrodibenzanthrone, prepared as already described, may be converted in substance into the product giving grey to black dyeings in the following manner:

100 parts of the diaminodibenzanthrone obtained by reduction of dinitrodibenzanthrone are suspended in 1000 parts of 15 per cent sulphuric acid. A solution of 30 parts of sodium chlorate in 500 parts of water is then allowed to flow in while stirring at from 90° to 100° C., the whole kept at the said temperature for several hours and then filtered by suction. The reaction product yields grey to black dyeings, depending on the color strength, from a blue vat.

Example 2

100 parts of dibenzanthrone are suspended in 500 parts of 20 per cent nitric acid and heated for several hours at from 80° to 90° C. The whole is diluted with water and the resulting nitrodibenzanthrone, which according to analysis is a mononitrodibenzanthrone, is filtered off by suction and dried. It is a blue-violet powder which yields a blue vat from which cotton is dyed blue-green shades of good fastness, especially of considerably better fastness to chlorine than that of dyeings produced with a mononitrodibenzanthrone prepared by the action of nitric acid on dibenzanthrone in an organic solvent.

*Example 3*

20 parts of very finely divided powdery dibenzanthrone are introduced at ordinary temperature, within 1 to 2 hours, into a mixture of 100 parts of a 65 per cent sulphuric acid and 20 parts of a 98 per cent nitric acid. The temperature is raised, within one hour, to about 55° C. and the mixture is stirred for about 2 hours.

After the reaction is complete, the mixture is poured into water, boiled up, and the reaction product filtered off by suction and washed. Its properties are similar to those of the product obtained according to Example 1.

*Example 4*

32 parts of monobromdibenzanthrone, in the form of an extremely fine powder, are entered, while stirring, into 320 parts of a 65 per cent nitric acid. The mass is then heated for about 4 hours to from 80° to 85° C. Then the mixture is allowed to cool, diluted with water and worked up in the usual manner. The reaction product obtained, according to analysis, is a monobromnitrodibenzanthrone which from a blue vat dyes vegetable fibres green shades which by aftertreatment with hypochlorite, depending on the intensity of coloration, turn gray to black.

*Example 5*

25 parts of monoaminodibenzanthrone are entered, while stirring, into 300 parts of a 65 per cent nitric acid. The mass is heated for 4 hours to about from 80° to 85° C. and worked up, after cooling, in the usual manner. From a blue vat the reaction product dyes cotton green shades which by aftertreatment with an oxidizing agent turn black.

*Example 6*

100 parts of a 96 per cent nitric acid are gradually entered, while stirring, into 100 parts of a 20 per cent aqueous paste of dibenzanthrone. After the addition of nitric acid is complete, the mixture is heated for several hours to from 80° to 85° C. and further worked up in the usual manner. The reaction product obtained is a dinitrodibenzanthrone the properties of which are similar to those of the reaction product obtained according to Example 1. Instead of a 20 per cent aqueous paste, a 50 per cent aqueous paste of dibenzanthrone may as well be employed.

What we claim is:—

1. Nitrodibenzanthrones containing between about 4.5 and about 6.5 per cent of nitrogen forming crystalline violet powders dissolving in concentrated sulphuric acid giving a blue coloration dyeing from a blue vat vegetable fibres green shades which by aftertreatment with hypochlorite become grey to black.

2. Nitrodibenzanthrone containing 5.4 to 5.8 per cent of nitrogen forming a crystalline violet powder dissolving in concentrated sulphuric acid giving a blue coloration dyeing from a blue vat vegetable fibres green shades which by aftertreatment with hypochlorite become grey to black.

3. Dinitrodibenzanthrone containing 5.1 to 5.4 per cent of nitrogen forming a crystalline violet powder dissolving in concentrated sulphuric acid giving a blue coloration dyeing from a blue vat vegetable fibres green shades which by aftertreatment with hypochlorite become grey to black.

4. Monobromnitrodibenzanthrone containing 4.4 to 5 per cent of nitrogen forming a crystalline violet powder dissolving in concentrated sulphuric acid giving a blue coloration dyeing from a blue vat vegetable fibres green shades which by aftertreatment with an oxidizing agent turn black.

KARL KOEBERLE.
HUGO WOLFF.
EMIL KRAUCH.